US012728655B2

(12) United States Patent
Ward et al.

(10) Patent No.: US 12,728,655 B2
(45) Date of Patent: Sep. 8, 2026

(54) VERTICAL PRINTER APPARATUS

(71) Applicant: Vivid Laminating Technologies Ltd, Ashby de la Zouch (GB)

(72) Inventors: Gavin Ward, Ashby de la Zouch (GB); Lewis Evans, Ashby de la Zouch (GB)

(73) Assignee: Vivid Laminating Technologies Ltd, Ashby de la Zouch (GB)

( * ) Notice: Subject to any disclaimer, the term of this patent is extended or adjusted under 35 U.S.C. 154(b) by 251 days.

(21) Appl. No.: 18/539,382

(22) Filed: Dec. 14, 2023

(65) Prior Publication Data

US 2024/0198705 A1 Jun. 20, 2024

(30) Foreign Application Priority Data

Dec. 14, 2022 (GB) ...................................... 2218819

(51) Int. Cl.
*B41J 29/02* (2006.01)
*B41J 3/407* (2006.01)

(52) U.S. Cl.
CPC ............... *B41J 29/02* (2013.01); *B41J 3/407* (2013.01)

(58) Field of Classification Search
CPC .................................. B41J 29/02; B41J 3/407
See application file for complete search history.

(56) References Cited

U.S. PATENT DOCUMENTS 4,547,786 A * 10/1985 Logan .................. H04N 1/1008 346/134
2013/0328953 A1 12/2013 Jones
2015/0225104 A1 8/2015 Reed
2018/0001662 A1 1/2018 Buchar et al.

FOREIGN PATENT DOCUMENTS

CN 208164557 U 11/2018
CN 109624523 A 4/2019
CN 211106391 U 7/2020
CN 211548623 U 9/2020
(Continued)

OTHER PUBLICATIONS

EPO; Extended European Search Report for corresponding European Patent Application No. 23215080.5, mailed May 29, 2024, 9 pages.

(Continued)

*Primary Examiner* — Justin Seo
(74) *Attorney, Agent, or Firm* — NK Patent Law

(57) ABSTRACT

A vertical printer apparatus is described. The apparatus includes a base and a printhead unit support frame extending substantially vertically above the base. A support frame actuator is configured to move the printhead unit support frame relative to the base along a longitudinal axis. A printhead unit is mounted to the printhead unit support frame and a printhead unit actuator is configured to move the printhead unit relative to the printhead unit support frame along a vertical axis that is substantially perpendicular to the longitudinal axis. The apparatus includes a workpiece support frame fixedly mounted to the base and configured to support a workpiece so that the normal of the workpiece is substantially perpendicular to the longitudinal and vertical axes. The workpiece support frame comprises at least one mounting unit for temporarily fixing the workpiece to the workpiece support frame.

13 Claims, 2 Drawing Sheets

(56) References Cited

FOREIGN PATENT DOCUMENTS

| | | | |
|---|---|---|---|
| CN | 113664385 | A | 11/2021 |
| CN | 113787837 | A | 12/2021 |
| CN | 216423863 | U | 5/2022 |
| DE | 19530242 | A1 | 2/1997 |
| FR | 2601265 | A1 | 1/1988 |
| WO | 2018065643 | A1 | 4/2018 |
| WO | 2018081871 | A1 | 5/2018 |

OTHER PUBLICATIONS

IPO, Combined Search and Examination Report for United Kingdom Patent Application No. GB2218819.7 dated Jun. 14, 2023, 8 pages.

* cited by examiner

VERTICAL PRINTER APPARATUS

CROSS-REFERENCE TO RELATED APPLICATIONS

This application claims priority to United Kingdom Patent Application No. 2218819.7, filed on Dec. 14, 2022, the entire content of which is incorporated by reference herein.

DESCRIPTION

Technical Field

The invention relates to a vertical printer apparatus, and in particular to an apparatus for printing on a workpiece. The workpiece can comprise material that is preferably, but not exclusively, a rigid or semi-rigid material such as card stock, fibreboard, foam board, or a sheet or panel of acrylic, polyvinyl chloride (PVC), aluminium composite material (ACM), glass or metal etc. A design or image can be printed directly on a surface of the workpiece.

The workpiece can also comprise a jig or mount for holding one or more items on which a design or image is to be printed.

SUMMARY OF THE INVENTION

The present invention provides a vertical printer apparatus comprising:

- a base;
- a printhead unit support frame extending substantially vertically above the base;
- a support frame actuator configured to move the printhead unit support frame relative to the base along a longitudinal axis;
- a printhead unit mounted to the printhead unit support frame;
- a printhead unit actuator configured to move the printhead unit relative to the printhead unit support frame along a vertical axis that is substantially perpendicular to the longitudinal axis; and
- a workpiece support frame fixedly mounted to the base and configured to support a workpiece so that the normal of the workpiece is substantially perpendicular to the longitudinal and vertical axes, wherein the workpiece support frame comprises at least one mounting unit for temporarily fixing the workpiece to the workpiece support frame, i.e., so that the workpiece is held securely in position during the printing process. After printing, the workpiece is released from the workpiece support frame.

The base can be constructed to be positioned on a horizontal surface such as a floor, for example, and is designed to provide a solid foundation for the apparatus. The base can comprise at least one rail or track that extends along the longitudinal axis, and more preferably a pair of parallel rails or tracks. Each rail or track can be formed in a plurality of sections. For example, the basic apparatus can be provided with a pair of parallel rail or track sections and additional rail or track sections can then be connected to these rail or track sections to extend the total length so that wider workpieces can be accommodated. It can be possible to extend the total height of the printhead unit support frame with additional frame sections so that taller workpieces can be accommodated. The workpiece support frame can also be formed in a plurality of sections so that it too can be extended to accommodate workpieces of different widths and heights.

Forming the apparatus generally in a plurality of sections, i.e., giving it a modular construction, also allows for compact storage when the apparatus is not being used. The maximum printable area of the workpiece depends on the maximum distance that the printhead unit can move along the longitudinal and vertical axes, which depends in turn on the length of the base and the height of the printhead unit support frame.

The printhead unit support frame can be movably mounted to the base. For example, it can be positioned on the rail(s) or track(s) so that it can be moved backwards and forwards along the rail(s) or track(s) by the support frame actuator. During the printing process, the printhead unit support frame will normally be moved in one direction along the longitudinal axis—e.g., from a first end of the base towards a second, opposite, end of the base—with the printhead unit being moved up and down relative to the base along the vertical axis. For example, during the printing process, the printhead unit support frame may be indexed—i.e., moved a pre-defined distance along the longitudinal axis—and the printhead unit is moved in an upward direction from the bottom of the printhead unit support frame to print part of the design or image. The printhead unit support frame is then indexed and the printhead unit is moved in a downward direction towards the bottom of the printhead unit support frame to print the next part of the design or image. This indexing of the printhead unit support frame and the subsequent up and down movement of the printhead unit is repeated until the printing process is complete.

The support frame actuator can be of any suitable type that is capable of moving the printhead unit support frame backwards and forwards along the longitudinal axis. For example, the support frame actuator can be an electric, mechanical or electro-mechanical actuator that includes an electric motor that drives a pinion gear that is engaged with a rack that extends along the longitudinal axis, or a drive wheel or belt etc.

The printhead unit can comprise one or more individual printheads of any suitable type, e.g., an inkjet type. Each printhead can be configured to apply any suitable ink, e.g., a water-based or UV-curable ink. Each printhead can be connected to an ink supply with one or more replaceable ink cartridges. The printhead unit and the actuators are controlled by a controller running software that controls the one or more individual printheads to print the desired image or design as they are moved relative to the workpiece. The printhead unit actuator can be of any suitable type that is capable of moving the printhead unit up and down the printhead unit support frame along the vertical axis. For example, the printhead unit actuator can be an electrical, mechanical or electro-mechanical actuator such as an electric motor with a drive gear, wheel or belt. Together, the printhead unit actuator and the support frame actuator allow the printhead unit to move in a plane that is defined by the longitudinal and vertical axes and is parallel to the plane of the workpiece when positioned in the apparatus.

The printhead unit may also be movable along a transverse axis that is perpendicular to the longitudinal and vertical axes so that the distance between the printhead unit and the workpiece (or workpiece support frame) can be adjusted. This can allow different thicknesses of workpiece to be accommodated. If the workpiece does not have a flat surface, or if the workpiece is a jig or mount for holding one or more items to be printed, the distance between the printhead unit and the workpiece can be adjusted automatically during the printing process. The apparatus can include a distance sensor such as a laser sensor, for example, to measure the distance between the printhead unit and the adjacent workpiece surface and the controller can adjust the position of the printhead unit accordingly, e.g., by controlling a suitable actuator. The printhead unit can be moved away from the workpiece support frame when the workpiece is being installed and then moved back towards the workpiece support frame so that it is a desired distance from the surface of the workpiece before the printing process starts.

An upper part of the printhead unit support frame can be movably mounted to the workpiece support frame so that the vertically-extending printhead unit support frame is properly supported at both its upper and lower parts. The workpiece support frame remains stationary and fixed relative to the base, and the printhead unit support frame therefore moves along the longitudinal axis relative to both the workpiece support frame and the base. Supporting the upper part of the printhead unit support frame improves the rigidity of the apparatus and prevents unwanted movement of the printhead unit during the printing process. This maintains the quality of the printed design or image.

The position of each mounting unit can be adjustable so that different sizes of workpiece can be accommodated and held securely during the printing process. For example, each mounting unit can be adjustably positioned on the workpiece support frame so that it can move along the longitudinal axis and/or vertical axis. Each mounting unit may be slidably mounted in a track or is adjustable using a suitable position-adjusting mechanism.

Each mounting unit can be of any suitable type. For example, each mounting unit can be a clip that is part of the workpiece support frame and is selectively operable between an open position and a closed position where an edge part of the workpiece is held securely by the clip so that the workpiece is temporarily fixed to the workpiece support frame. However, it can be preferred that each mounting unit comprises a vacuum suction cup. Each vacuum suction cup can be positioned adjacent a rear surface of the workpiece—i.e., the surface that faces away from the printhead unit. This is particularly advantageous because the vacuum suction cups will not interfere with the printing process, and it is possible for a design or image to be printed on the whole of the workpiece surface. This is not possible if a clip or other mounting unit covers an edge of the workpiece.

Each vacuum suction cup is connected to a suitable vacuum generator that provides the required vacuum. Each vacuum suction cup can be connected using a suitable hose and a vacuum assembly of the vertical printer apparatus can also include other fittings, valves and regulators for controlling the vacuum. The workpiece can be installed with its rear surface in contact with the vacuum suction cup(s). The vacuum generator can then be turned on to securely hold the workpiece relative to the workpiece support frame. When the printing process is complete, the vacuum generator can be turned off so that the workpiece can be released from the vacuum suction cup(s) and removed.

The workpiece support frame can comprise a bottom support for supporting the bottom edge of the workpiece. This can provide proper support for a workpiece that may be made from a dense or heavy rigid or semi-rigid material, for example.

The bottom support can include a plurality of rollers. The rollers can make it easier to install a workpiece from one end of the apparatus. The leading end of the workpiece can be placed on the bottom support and the workpiece can then be pushed forward on the rollers until it is properly positioned on the workpiece support frame.

The bottom support can be formed in a plurality of sections. Each section can comprise an actuator configured to move the section relative to the base along the vertical axis. In particular, a controller can be configured to lower each bottom support section when the printhead unit is substantially aligned with the bottom support section along the longitudinal axis. This means that the support sections are sequentially lowered as the printhead unit support frame moves along the longitudinal axis to remove any potential obstruction to the printhead unit and allow the printhead unit to print the design or image along the bottom edge of the workpiece. Once the printhead unit is no longer substantially aligned with each bottom support section, it is raised back to its original position where it contacts a bottom edge of the workpiece. The bottom edge of the workpiece is normally always supported by at least two bottom support sections during the printing process.

As noted briefly above, a design or image can be printed directly on a surface of a workpiece, which surface can be substantially flat or profiled. If the surface is profiled, the distance between the printhead unit and the surface can be automatically adjusted during the printing process as described above. The workpiece can also be a jig or mount configured to hold one or more items. In this case, the design or image is printed on the items, not on the workpiece.

The present invention further provides a method of using a vertical printer apparatus comprising:

a base;

a printhead unit support frame extending substantially vertically above the base and configured to move relative to the base along a longitudinal axis;

a printhead unit mounted to the printhead unit support frame and configured to move relative to the printhead unit support frame along a vertical axis that is substantially perpendicular to the longitudinal axis; and a workpiece support frame fixedly mounted to the base, the workpiece support frame comprising at least one mounting unit;

the method comprising:

using the workpiece support frame to support a removable workpiece so that the normal of the workpiece is substantially perpendicular to the longitudinal and vertical axes, wherein the workpiece is temporarily fixed to the workpiece support frame by the at least one mounting unit; and using the printhead unit to print the removable workpiece.

The method can further comprise removing the printed workpiece from the workpiece support frame.

The method can further comprise moving the printhead unit support frame relative to the base along the longitudinal axis when the workpiece is being printed.

The workpiece support frame can comprise a bottom support for supporting a bottom edge of the removable workpiece and where the bottom support is formed in a plurality of sections. The method can further comprise lowering each bottom support section when the printhead unit is substantially aligned with the bottom support section along the longitudinal axis, and subsequently raising each bottom support section when the printhead unit is no longer substantially aligned with the bottom support section.

BRIEF DESCRIPTION OF DRAWINGS

As shown in FIGS. 1 and 2, a vertical printer apparatus 1 includes a base 2 and a printhead unit support frame 4 extending substantially vertically above the base 2. The base 2 can includes a pair of parallel rails or tracks, only one of which is visible in FIG. 1. The base 2 is constructed to be positioned on a horizontal surface such as a floor, for example.

Figure 1:
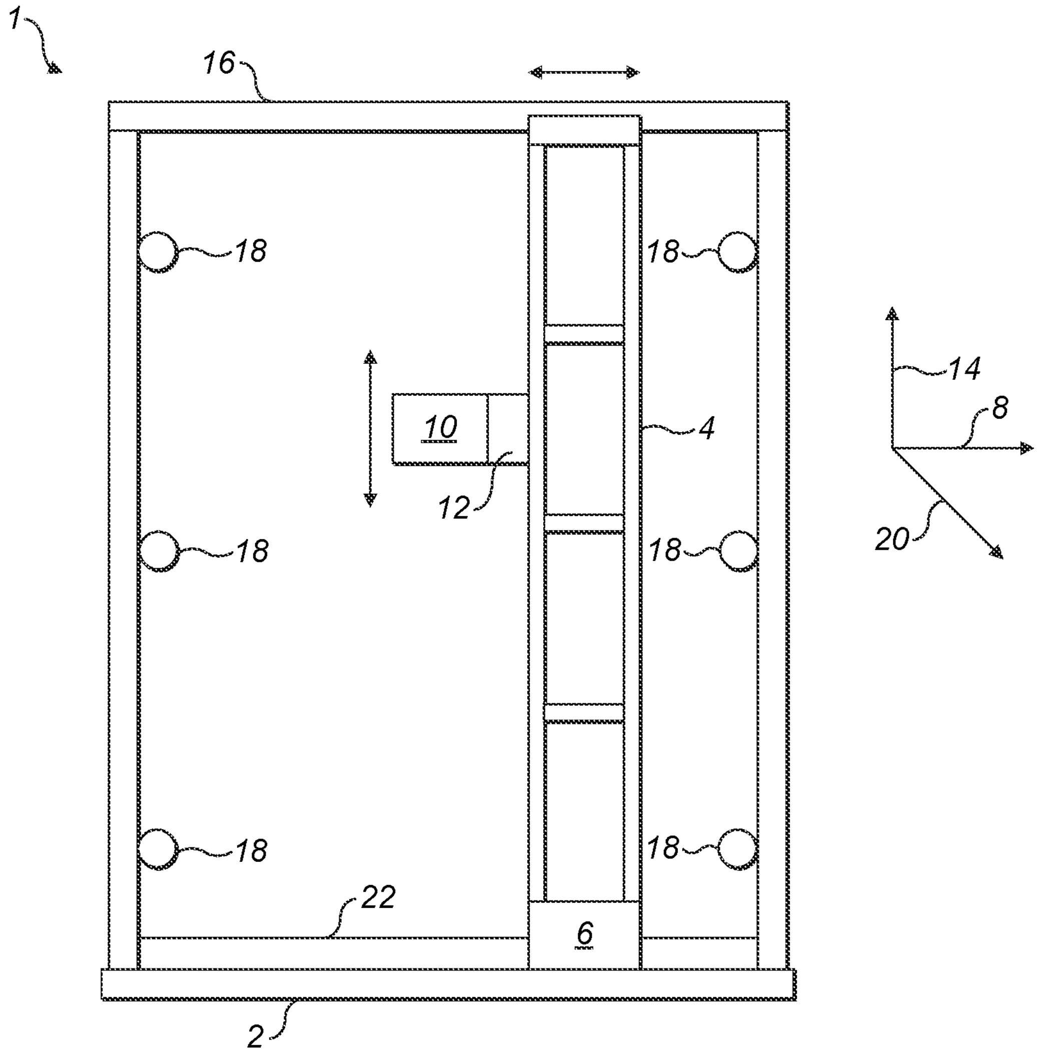
FIG. 1 is a schematic front view of a vertical printer apparatus according to the present invention.

The printhead unit support frame 4 is movably mounted to the base 2. A support frame actuator 6 is positioned at a bottom part of the printhead unit support frame 4 and is configured to move the printhead unit support frame backwards and forwards along the parallel rails or tracks (i.e., relative to the base 2 along a longitudinal axis 8).

A printhead unit 10 with any suitable number of inkjet type printheads is mounted to the printhead unit support frame 4 and is moved up and down along the printhead unit support frame by a printhead unit actuator 12 (i.e., along a vertical axis 14 that is substantially perpendicular to the longitudinal axis).

A workpiece support frame 16 is fixedly mounted to the base 2 and is configured to support a workpiece W (FIG. 2) so that the normal of the workpiece is substantially perpendicular to the longitudinal and vertical axes. An upper part of the printhead unit support frame 4 is movably mounted to the workpiece support frame 16 so that the printhead unit support frame is properly supported at both its upper and lower parts. The workpiece support frame 16 remains stationary and fixed relative to the base 2 and the printhead unit support frame 4 therefore moves along the longitudinal axis 8 relative to both the workpiece support frame 16 and the base 2. Supporting the upper part of the printhead unit support frame 4 improves the rigidity of the apparatus and prevents unwanted movement of the printhead unit 10 during the printing process. This maintains the quality of the printed design or image.

Figure 2:
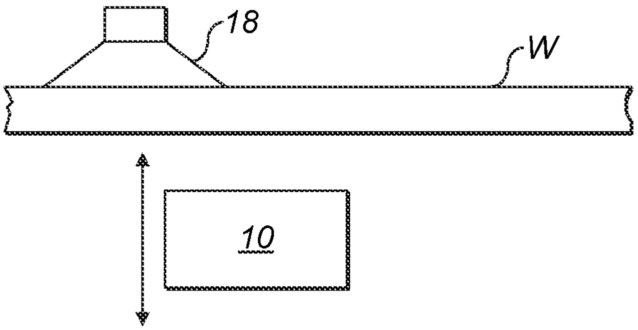
FIG. 2 is a schematic top view of part of the vertical printer apparatus of FIG. 1.
Figure 3:
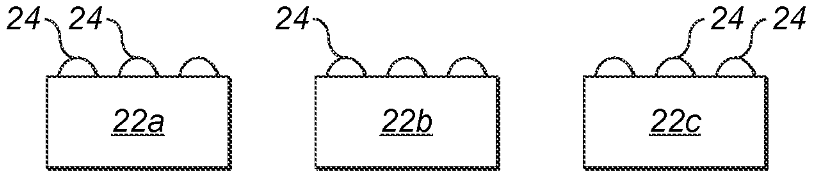
FIG. 3 is a schematic front view of a bottom support of the vertical printer apparatus of FIG. 1 formed as a plurality of sections.
Figure 4:
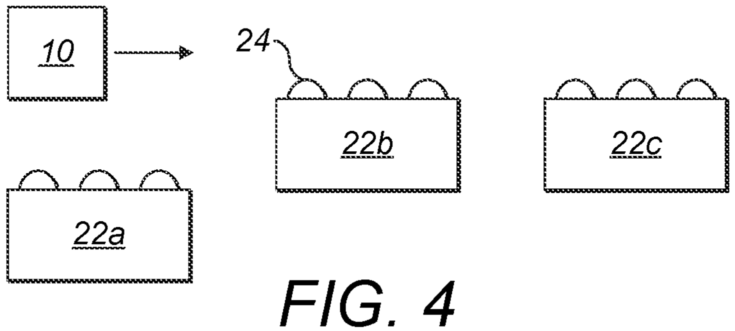
FIGS. 4 to 6 are schematic front views showing how the support sections of FIG. 3 are lowered sequentially.
Figure 5:
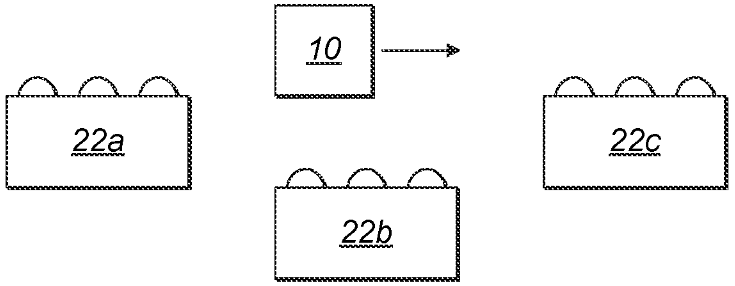
Figure 6:

The workpiece support frame 16 comprises a plurality of mounting units in the form of vacuum suction cups 18, but it will be understood that other types of mounting unit can also be used. The position of each vacuum suction cup 18 can be adjusted so that different sizes of workpiece can be accommodated and temporarily held securely during the printing process. For example, each vacuum suction cup 18 can be adjustably positioned on the workpiece support frame 16 so that it can move along the longitudinal axis and/or vertical axis. It may also move along the transverse axis if necessary. Each vacuum suction cup 18 is connected to a vacuum generator (not shown) using a suitable hose. The vacuum suction cups 18 and the vacuum generator (not shown) are part of a vacuum assembly that includes other fittings, valves and regulators for controlling the vacuum. FIG. 2 shows how the workpiece W is installed with its rear surface in contact with the vacuum suction cups 18 (only one of which is shown for simplicity). The vacuum generator can be turned on to securely hold the workpiece W relative to the workpiece support frame 16 during the printing process. When the printing process is complete, the vacuum generator can be turned off so that the workpiece W is released and can be removed.

During the printing process, the printhead unit support frame 4 will normally be moved in one direction along the longitudinal axis 8—e.g., from a first end of the base towards a second, opposite, end of the base or from left to right as shown in FIG. 1—with the printhead unit 19 being moved up and down relative to the base 2 along the vertical axis 14. For example, during the printing process, the printhead unit support frame 4 may be indexed—i.e., moved a pre-defined distance along the longitudinal axis—and the printhead unit 10 is moved in an upward direction from the bottom of the printhead unit support frame to print part of the design or image. The printhead unit support frame 4 is then indexed and the printhead unit 10 is moved in a downward direction towards the bottom of the printhead unit support frame to print the next part of the design or image. This indexing of the printhead unit support frame 4 and the subsequent movement of the printhead unit 10 is repeated until the printing process is complete. The printhead unit actuator 12 and the support frame actuator 6 allow the printhead unit 10 to move in a plane that is defined by the longitudinal and vertical axes and is parallel to the plane of the workpiece W when positioned in the apparatus.

As shown in FIG. 2, the printhead unit 10 may also be movable along a transverse axis 20 that is perpendicular to the longitudinal and vertical axes 8, 14 so that the distance between the printhead unit 10 and the workpiece W (or the workpiece support frame 16) can be adjusted. The printhead unit 10 is movable along the transverse axis 20 relative to the printhead unit support frame 4.

The workpiece support frame 16 includes a bottom support 22 for supporting the bottom edge of the workpiece. This can provide proper support for a workpiece that may be made from a dense or heavy rigid or semi-rigid material, for example.

As shown in FIGS. 3 to 6, the bottom support 22 is formed in a plurality of sections 22*a*, 22*b* and 22*c*. Each support section includes a plurality of rollers 24. The rollers 24 make it easier to install a workpiece W from one end of the apparatus. The leading end of the workpiece W can be placed on the bottom support 22 and the workpiece can then be pushed forward on the rollers 24 until it is properly positioned on the workpiece support frame 16. Each support section 22*a*, 22*b* and 22*c* includes an actuator (not shown) configured to move the section along the vertical axis 14. A controller (not shown) is configured to lower each support section 22*a*, 22*b* and 22*c* when the printhead unit 10 is substantially aligned with the bottom support section along the longitudinal axis 8, and to raise each support section when the printhead unit 10 has moved past it. This means that the support sections 22*a*, 22*b* and 22*c* are sequentially lowered and raised as the printhead unit support frame 4 moves along the longitudinal axis 8 during the printing process—see FIGS. 4 to 6. Lowering the support sections 22*a*, 22*b* and 22*c* removes any potential obstruction to the printhead unit 10 and allows the printhead unit to print the design or image along the bottom edge of the workpiece W.

The invention claimed is:

1. A vertical printer apparatus comprising:

a base;

a printhead unit support frame extending substantially vertically above the base;

a frame actuator configured to move the printhead unit support frame relative to the base along a longitudinal axis;

a printhead unit mounted to the printhead unit support frame;

a printhead unit actuator configured to move the printhead unit relative to the printhead unit support frame along a vertical axis that is substantially perpendicular to the longitudinal axis; and a workpiece support frame fixedly mounted to the base and configured to support a removable workpiece so that the normal of the workpiece is substantially perpendicular to the longitudinal and vertical axes, wherein the workpiece support frame comprises at least one mounting unit for temporarily fixing the removable workpiece to the workpiece support frame; and wherein the workpiece support frame comprises a bottom support for supporting a bottom edge of the removable workpiece and wherein the bottom support includes a plurality of rollers.

2. The vertical printer apparatus of claim 1, wherein the base comprises at least one rail that extends along the longitudinal axis.

3. The vertical printer apparatus of claim 1, wherein the frame actuator includes an electric motor driving a pinion gear.

4. The vertical printer apparatus of claim 1, wherein the printhead unit comprises one or more printheads.

5. The vertical printer apparatus of claim 1, wherein an upper part of the printhead unit support frame is movably mounted to the workpiece support frame.

6. The vertical printer apparatus of claim 1, wherein each mounting unit comprises a vacuum suction cup connectable to a vacuum generator.

7. The vertical printer apparatus of claim 1, wherein the bottom support is formed in a plurality of sections, each section comprising an actuator configured to move the section relative to the base along the vertical axis.

8. The vertical printer apparatus of claim 7, further comprising a controller configured to lower each bottom support section when the printhead unit is substantially aligned with the bottom support section along the longitudinal axis, and to subsequently raise each bottom support section when the printhead unit is no longer substantially aligned with the bottom support section.

9. The combination of the vertical printer apparatus of claim 1 and a removable workpiece, wherein the workpiece is a jig or mount configured to hold one or more items.

10. A method of using a vertical printer apparatus comprising:

a base;

a printhead unit support frame extending substantially vertically above the base and configured to move relative to the base along a longitudinal axis;

a printhead unit mounted to the printhead unit support frame and configured to move relative to the printhead unit support frame along a vertical axis that is substantially perpendicular to the longitudinal axis; and a workpiece support frame fixedly mounted to the base, the workpiece support frame comprising at least one mounting unit;

wherein the workpiece support frame comprises a bottom support for supporting a bottom edge of a removable workpiece and wherein the bottom support includes a plurality of rollers the method comprising:

using the workpiece support frame to support the removable workpiece so that the normal of the workpiece is substantially perpendicular to the longitudinal and vertical axes, wherein the workpiece is temporarily fixed to the workpiece support frame by the at least one mounting unit; and using the printhead unit to print the removable workpiece.

11. The method of claim 10, further comprising removing the printed workpiece from the workpiece support frame.

12. The method of claim 10, further comprising moving the printhead unit support frame relative to the base along the longitudinal axis when the workpiece is being printed.

13. The method of claim 12, the bottom support being formed in a plurality of sections, and wherein the method further comprises lowering each bottom support section when the printhead unit is substantially aligned with the bottom support section along the longitudinal axis, and subsequently raising each bottom support section when the printhead unit is no longer substantially aligned with the bottom support section.

* * * * *